(12) United States Patent
Peng et al.

(10) Patent No.: US 12,442,918 B2
(45) Date of Patent: Oct. 14, 2025

(54) ACQUISITION AND PROCESSING OF V-WAVE ULTRASOUND DATA USING A LINEAR OR CURVED ARRAY TRANSDUCER

(71) Applicant: CLOUDSTREAM MEDICAL IMAGING, INC., Houston, TX (US)

(72) Inventors: Chengbin Peng, Houston, TX (US); Jun Tang, Houston, TX (US)

(73) Assignee: CLOUDSTREAM MEDICAL IMAGING, INC., Houston, TX (US)

( * ) Notice: Subject to any disclaimer, the term of this patent is extended or adjusted under 35 U.S.C. 154(b) by 162 days.

(21) Appl. No.: 18/288,365

(22) PCT Filed: May 3, 2022

(86) PCT No.: PCT/US2022/027440
§ 371 (c)(1),
(2) Date: Oct. 25, 2023

(87) PCT Pub. No.: WO2022/235646
PCT Pub. Date: Nov. 10, 2022

(65) Prior Publication Data
US 2024/0210560 A1 Jun. 27, 2024

Related U.S. Application Data

(60) Provisional application No. 63/184,174, filed on May 4, 2021.

(51) Int. Cl.
*G01S 15/89* (2006.01)

(52) U.S. Cl.
CPC ...... *G01S 15/8995* (2013.01); *G01S 15/8918* (2013.01); *G01S 15/892* (2013.01); *G01S 15/8927* (2013.01)

(58) Field of Classification Search
CPC ............ G01S 15/8995; G01S 15/8918; G01S 15/892; G01S 15/8927; G01S 7/52026;
(Continued)

(56) References Cited

U.S. PATENT DOCUMENTS 4,882,714 A * 11/1989 Tanigawa ................ G01S 15/02
367/105
4,970,700 A * 11/1990 Gilmour .............. G10K 11/352
367/88
(Continued)

FOREIGN PATENT DOCUMENTS

CN 112022215 A * 12/2020 ........... A61B 3/1005
CN 117581116 A * 2/2024 ............. A61B 8/565
(Continued)

OTHER PUBLICATIONS

David Maresca et al., "Nonlinear X-Wave Ultrasound Imaging of Acoustic Biomolecules", Physical Review X, vol. 8, No. 4, Oct. 2018, pp. 41002-41002-12, XP093242982.

*Primary Examiner* — Daniel Pihulic
(74) *Attorney, Agent, or Firm* — SZDC Law PC

(57) ABSTRACT

An ultrasound system includes: a V-wave ultrasound data acquisition system with a transducer that includes an array of transducer elements, the array of transducer elements including a first sub-array and a second sub-array; a V-wave ultrasound beamformer to receive ultrasound beams from the V-wave ultrasound data acquisition system and generate ultrasound images; and an ultrasound image display to render the ultrasound images locally or transmit the images over internet.

11 Claims, 13 Drawing Sheets

(58) Field of Classification Search
CPC ......... A61B 8/4494; A61B 8/54; A61B 8/565; A61B 8/5207
See application file for complete search history.

(56) References Cited

U.S. PATENT DOCUMENTS

| | | | | |
|---|---|---|---|---|
| 6,678,210 | B2 * | 1/2004 | Rowe | G10K 11/343 |
| | | | | 367/102 |
| 7,463,553 | B2 * | 12/2008 | Dubuis | G01S 15/89 |
| | | | | 367/103 |
| 11,350,909 | B2 * | 6/2022 | Maresca | G01S 15/8927 |
| 2014/0187945 | A1 | 7/2014 | Sandy et al. | |
| 2016/0113625 | A1 * | 4/2016 | Kim | G01N 29/262 |
| | | | | 600/459 |
| 2018/0177491 | A1 | 6/2018 | Hynynen et al. | |
| 2019/0021700 | A1 | 1/2019 | Zwirn | |
| 2019/0314001 | A1 * | 10/2019 | Maresca | G01S 15/8915 |
| 2020/0225335 | A1 | 7/2020 | Besson et al. | |
| 2020/0284902 | A1 * | 9/2020 | Kruse | A61B 8/4488 |
| 2024/0210560 | A1 * | 6/2024 | Peng | G01S 15/892 |

FOREIGN PATENT DOCUMENTS

| | | | | |
|---|---|---|---|---|
| WO | 2020249359 | A1 | 12/2020 | |
| WO | WO-2022235646 | A1 * | 11/2022 | ......... G01S 15/8927 |
| WO | WO-2022270362 | A1 * | 12/2022 | ........... G01N 29/265 |

* cited by examiner

ACQUISITION AND PROCESSING OF V-WAVE ULTRASOUND DATA USING A LINEAR OR CURVED ARRAY TRANSDUCER

This application is the National Stage Application of PCT/US2022/027440, filed on May 3, 2022, which claims priority to U.S. Provisional Patent Application No. 63/184,174, filed on May 4, 2021, which is incorporated by reference for all purposes as if fully set forth herein.

FIELD OF THE INVENTION

The present invention relates to an ultrasound system that includes a V-wave ultrasound data acquisition and a method for beamforming and processing V-wave ultrasound beam data.

BACKGROUND OF THE INVENTION

Medical ultrasound imaging for diagnosis has advantages, such as reasonable cost, real-time imaging, portability, and its harmless effect, over computerized tomography (CT) and magnetic resonance imaging (MRI) [1, 2]. However, the resolution of the ultrasound imaging system is usually lower than that of CT and MRI systems [3]. Ultrasound imaging technology is progressing towards high quality and sharp resolution, thanks to better data acquisition hardware and sophisticated processing software [4].

Commonly used ultrasound transducers include linear array transducers, curved array transducers, and phased array transducers. Ultrasound images of a linear array transducer have a rectangular shape. Since the linear array is normally used for precise imaging, its operating frequency is high. In contrast, the convex array is used to acquire a wide and deep ultrasound image at the cost of the resolution. For this reason, the elements of the convex array are arranged in a curved fashion along the azimuthal direction. The method of acquiring an image using a convex array is the same as that when using a linear array but the ultrasound image of the convex array has a fan shape. In the case of a target object being behind obstacles it is difficult to obtain an ultrasound image using the linear array or the convex array. For this case, a phased array can be used by steering the ultrasound beams at oblique angles. Ultrasound images of a phased array have a circular cone shape. Recently concave ultrasound transducers are also proposed for 3D arrays [5]. 3D ultrasound imaging systems are in actively development and a lot of innovations are happening in that space [6].

Commonly used ultrasound data acquisition for medical applications includes focused beams, divergent beams, and planewave beams [7-10]. Single element transmission is seldom used in medical ultrasound imaging because it is time consuming for data collection and poor in signal to noise ratio. In ultrasound data acquisition using focused beams the time delay of each transmitter is electronically controlled in such a way that, at the focal point of a beam which is in front of the transducer and inside the image domain, transmitters employed by this beam emit waves that arrive at the focal point at the same time. The in-sonification at the focal point is very strong and it rapidly dies down away from the focal point. In ultrasound data acquisition using divergent beams the time advance of each transmitter is electronically controlled in such a way that, at the focal point of a given beam which is behind the transducer and outside the image domain, transmitters employed by this beam virtually emit waves from the focal point at the same time. The in-sonification in the image domain is weak and divergent out. In ultrasound data acquisition using planewave beams the time advance of each transmitter is similar to that of a divergent beam except the virtual focal point is far away behind the transducer. All transmitters participate in the excitation of each planewave beam. The in-sonification of a planewave beam in the image domain is weak and uniform [1,7]. Most commercial ultrasound scanners employ a focused beam data acquisition because the signal to noise ratio is much higher in the final image, thanks to the focusing ability. The downside of focused beam data acquisitions is much reduced frame rate compared to the planewave modality [9-10].

The present invention relates to acquisition and processing of ultrasound data for medical applications. In particular, the invention addresses two urgent needs in medical diagnostic imaging: (1) faster frame rate for imaging blood flows and a beating heart (2) accurate detection of the speed and direction of tissue movements [7-10]. The present invention uses the term V-wave beam data acquisition and processing, or V-wave beamforming. The two terminologies are used interchangeably. The V-wave beamforming is 2× faster than planewave beamforming. It also has higher signal to noise ratio in the center part of its image domain where a physician is mostly interested, thanks to its ability to direct energies towards the center. The ability to rapidly illuminate a large volume of tissues with ultrasound in-sonification, especially at the center part with some focusing capability, and properly image all echoes reflected from acoustic contrasts in the tissues makes the V-wave beamforming a very useful tool for diagnosing cardiovascular diseases, heart diseases, blood blockages, malignant cancers where blood flows are faster and plenty, to name a few.

SUMMARY OF THE INVENTION

In one embodiment, the present application discloses an ultrasound system that includes: a V-wave ultrasound data acquisition with a transducer that includes an array of transducer elements, the array of transducer elements including a first sub-array and a second sub-array; a V-wave ultrasound beamformer to receive ultrasound beams from the V-wave ultrasound data acquisition and generate ultrasound images; and an ultrasound image display to render the ultrasound images locally or transmit the images over internet. The first sub-array transmits first planar wave ultrasound beams in a plural of inward directions, and the first planar wave ultrasound beams have a plural of first flex angle $\alpha_1$, the first flex angle $\alpha_1$ being an angle of the local wave front of the first planar wave ultrasound beam and the first sub-array; the second sub-array transmits second planar wave ultrasound beams in a plural of conjugate directions at a same time, and the second planar wave ultrasound beams have a plural of second flex angle $\alpha_2$, the second flex angle $\alpha_2$ being an angle of the local wave front of the second planar wave ultrasound beam and the second sub-array; the inward direction and the conjugate direction are opposing each other; and the local wave front of the first planar wave ultrasound beam and the local wave front of the second planar wave ultrasound beam form a V-shaped pattern.

In another embodiment, the array of transducer elements is a linear array.

In another embodiment, the array of transducer elements is a curved array.

In another embodiment, the first flex angle $\alpha_1$ is identical to the second flex angle $\alpha_2$.

In another embodiment, the first flex angle $\alpha_1$ and the second flex angle $\alpha_2$ are each larger than 0° but less than 90°.

In another embodiment, the first flex angle $\alpha_1$ and the second flex angle $\alpha_2$ are each larger than 0° but less than 45°.

In another embodiment, the first sub-array and the second sub-array connect continuously to form the array of transducer elements and have a mirror symmetry in transmission.

In another embodiment, the first sub-array starts to transmit the first planar wave ultrasound beams from an edge thereof to a mirror symmetry center with each time slope a function of the first flex angle $\alpha_1$.

In another embodiment, the second sub-array starts to transmit the second planar wave ultrasound beams from an edge thereof to a mirror symmetry center with each time slope a function of the second flex angle $\alpha_2$.

In another embodiment, the present application discloses a method for beamforming and processing V-wave ultrasound beam data that includes: (i) taking an input trace from the V-wave ultrasound beam data; (ii) spraying the V-wave ultrasound beam data along impulse response curves; (iii) accumulating contributions at each image location; (iv) repeating steps (i)-(iii) for all data traces in all input beams; and (v) performing post processing and coherent compounding to obtain the final image.

In another embodiment, the method further includes performing frequency filtering to protect the V-wave ultrasound beam data from aliasing or excessive wavelet distortion during beamforming.

In another embodiment, the method further includes forming partial image volumes for generation of common image point gathers.

In another embodiment, the impulse response curves are calculated using equations (4a), (4b), 6(a) and (6b):

$$t(x_r, x, z) + t(x_s, x, z) = t + \Delta t_B(x_s) \quad (4a)$$

$$\frac{\partial t(x_s, x, z)}{\partial x_s} = \frac{\partial \Delta t_B(x_s)}{\partial x_s} \quad (4b)$$

$$\Delta t_B(x_s) = \frac{|x_s - x_c|}{C} \sin\alpha\, g\!\left(\frac{x_s - x_c}{\Delta x}\right) \quad (6a)$$

$$g(x) = \gamma\!\left(\frac{2}{kx}\ln\!\left(\frac{1+e^{kx}}{2}\right) - 1\right) \quad (6b)$$

C is a sound speed, $\alpha$ is a flex angle, the center of a transducer is at $x_c$, a transmitter is at $x_s$, a receiver is at $x_r$, an output image point is at (x, z), t is an observed time, $\Delta t_B$ is a transmitter time delay, $t(x_r, x, z)$ is a travel time from $x_r$ to (x, z), and $t(x_s, x, z)$ is a travel time from $x_s$ to (x, z), $\Delta x$ is a pitch size of the transducer, a coefficient $\gamma$ is used to scale the value of function g(x) to 1 at the farthest edge of a probe, a parameter k is used to control the linearity of function g(x).

In another embodiment, other choices of function $\Delta t_B$ are used as long as their first derivatives are continuous at $x_s = x_c$.

In another embodiment, the method further includes: performing frequency filtering to protect the V-wave ultrasound beam data from aliasing or excessive wavelet distortion during beamforming.

In another embodiment, the method further includes: forming partial image volumes for generation of common image point gathers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
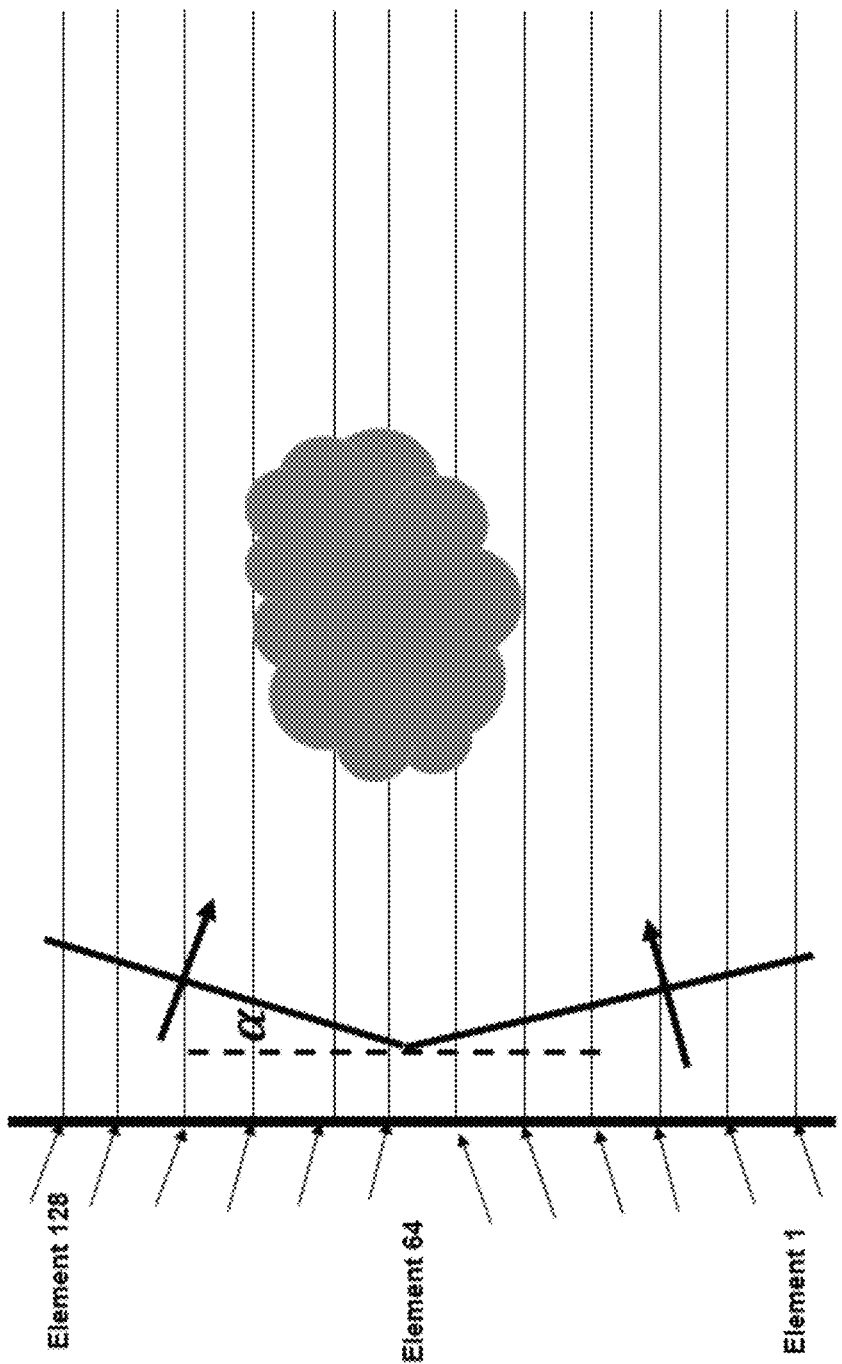
FIG. 1 shows V-wave ultrasound data acquisition for a 128-element linear array transducer. Two conjugate wavefronts are propagating simultaneously inside image domain, illuminating target objects from both sides. The flex angle is the angle between a local wavefront and the array. The larger the flex angle, the more juxtaposed are the two wavefronts.

Reference will now be made in detail to embodiments of the present invention, example of which is illustrated in the accompanying drawings.

A novel set of ultrasound data is collected with a novel design of transmission pattern of a transducer whose elements are arranged in a linear or curved array. In this design half of the elements on the transducer are used to transmit a local coherent wave in one inward direction and the other half of elements are used to transmit another local coherent wave in a conjugate direction. The two propagation directions are opposing each other and are symmetric with respect to the normal to the transducer at the center. Transmitters at both edges are fired earlier than the center one with a time slope a function of the flex-angle $\alpha$ (measured with respect to the array). If one holds the transducer horizontally, the left half of transmitters will illuminate the center and the right portion of the image domain, and the right half of transmitters will illuminate the center and left portion of the image domain. Compared to a planewave data acquisition only half the number of beams is required in V-wave data acquisition to achieve comparable image quality and resolution at the center of the image domain, effectively doubling the frame rate of a conventional planewave ultrasound scanner.

To properly beamform V-wave ultrasound beam data we devise the following special processing steps: (i) take one input trace from a V-wave ultrasound beam data; (ii) optionally perform frequency filtering to protect the data from aliasing or excessive wavelet distortion during beamforming; (iii) spray the data along impulse response curves calculated using equations disclosed in this invention; (iv) accumulate contributions at each image location, optionally form partial image volumes for generation of common image point gathers; (v) repeat steps (i)-(iv) for all data traces in all input beams; (vi) perform post processing and coherent compounding to obtain the final image.

The V-wave data beamforming will be 2× faster than the conventional planewave data beamforming. Ultrasound scanners configured with V-wave beam data acquisition and processing are particularly suitable for imaging tissues in motion such as a beating heart and micro vibration of nerves. They are also suitable for imaging flowing objects such as gas bubbles in a blood stream and rapid blood flows around a malignant cancerous lesion. A V-wave ultrasound scanner is not only 2× faster than a planewave ultrasound scanner but also better in image quality and SNR. The V-wave ultrasound scanner is ideal for imaging and characterization of fast-moving tissues and organs such as blood flow, blood vessel vibration, and heart tissues, to name a few.

Technical Description

Focused ultrasound beams are widely used in commercial B-mode diagnostic imaging of tissues and organs [1, 3]. Less common are divergent ultrasound beams and planewave ultrasound beams. Planewave ultrasound beams are particularly promising for its high frame rate and uniform illumination [7-8]. A high frame rate data acquisition is necessary for imaging objects in motion, such as blood flows, beating hearts, and micro vibrations inside tissues. We propose a new data acquisition method that can achieve approximately twice the frame rate of planewave beam data acquisition without any loss of resolution and image quality.

PART I: V-WAVE BEAM DATA ACQUISITION 1.1 Definition of V-Wave Beams

A V-wave ultrasound beam data is collected with a novel design of transmission pattern of a transducer whose elements are arranged in a linear or curved array. In this design of transmission pattern half of the elements on the transducer are used to transmit a local coherent wave in one inward direction and the other half of elements are used to transmit another local coherent wave in a conjugate direction. The two propagation directions are opposing each other and are symmetric with respect to the normal direction to the transducer at the center (FIG. 1). The transmitter time advance (negative of time delay) is minimal (or zero) at the center and increases towards both edges with a time slope that is a function of the sine of the flex-angle α (measured with respect to the array). If one holds the transducer horizontally, the left half of transmitters will illuminate the center and the right portion of the image domain, and the right half of transmitters will illuminate the center and left portion of the image domain. Compared to planewave beam data acquisition only half of beams are required in V-wave beam data acquisition to achieve comparable image quality and resolution at the center of the image domain, effectively doubling the frame rate of an ultrasound scanner.

1.2 V-Wave Transmission Design

Figure 2:
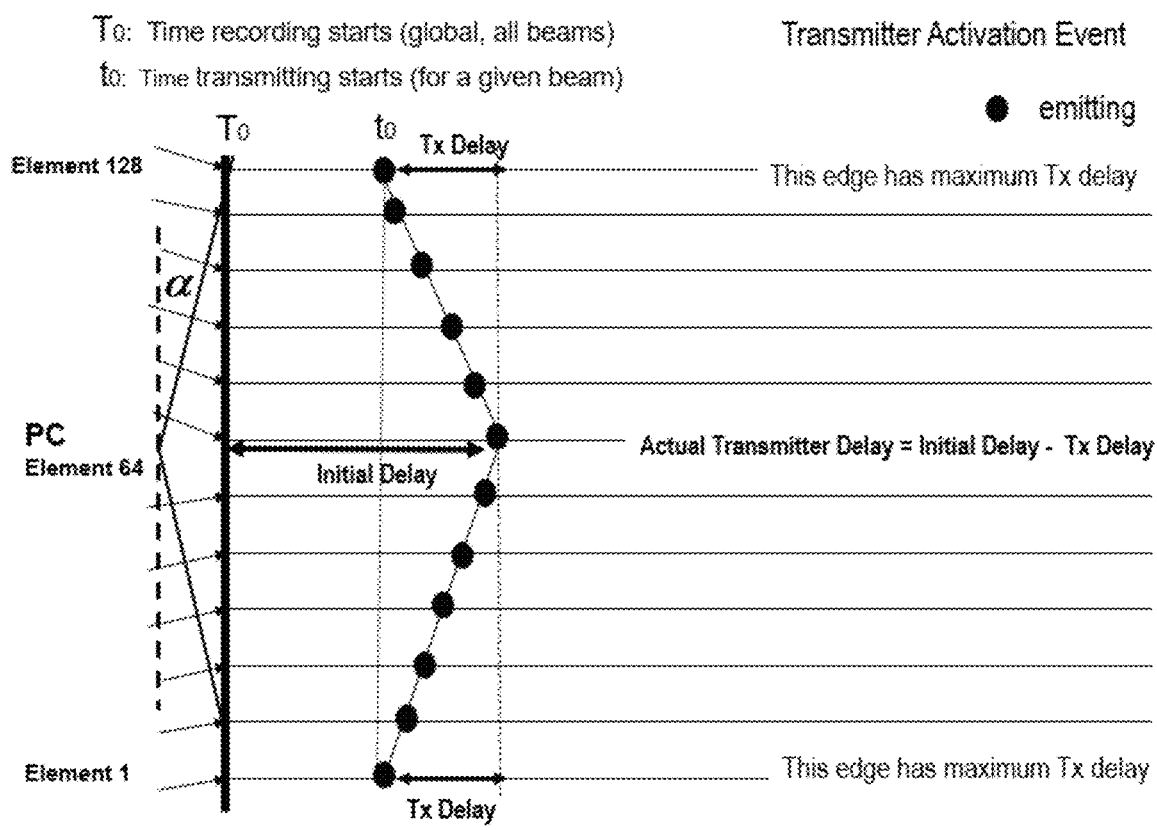
FIG. 2 illustrates a transmission pattern for V-wave ultrasound beam data acquisition for a 128-element linear array transducer placed vertically. Half of the elements are used to transmit a local coherent wave in one direction and the other half of the elements are used to transmit another local coherent wave in the conjugate direction. The flex angle is the angle between the local wavefront and the array. T0 is the time ADC recording is activated. t0 is the time the transmitter on one of the edges is activated. The Tx delay is approximately a linear function of the transmitter coordinate with respect to the probe center (PC). T0 can be less than, equal to, or great than t0.

FIG. 2 shows the transmission design for acquisition of V-wave ultrasound beam data. The horizontal axis is lapsing time and the vertical axis is element position. We use a linear array of 128 elements as an example. The design equally applies to other array configurations, such as linear arrays with more than or less than 128 elements, curved arrays with arbitrary number of elements, or phased arrays with arbitrary number of elements. In FIG. 2 the transducer is placed vertically at the left. Acoustic waves propagate from left to right into human tissues in various tilted angles. The initial delay is set by the acquisition system. The Tx delay pattern is V-shaped, with the top half in a mirror symmetry with the bottom half. The total delay for a transmitter is the initial delay minus the Tx delay. The flex angle α varies from 0 to a pre-defined maximum angle. The Tx delay values are computed using a pre-defined formula that is a function of the flex angle and the distance between a transmitter and the probe center. The formula is given in Part II of this publication. Other formula can also be used. In general, as the flex angle increases the Tx delays at both edges of the transducer increase.

1.3 V-Wave Reception Design

Figure 3:
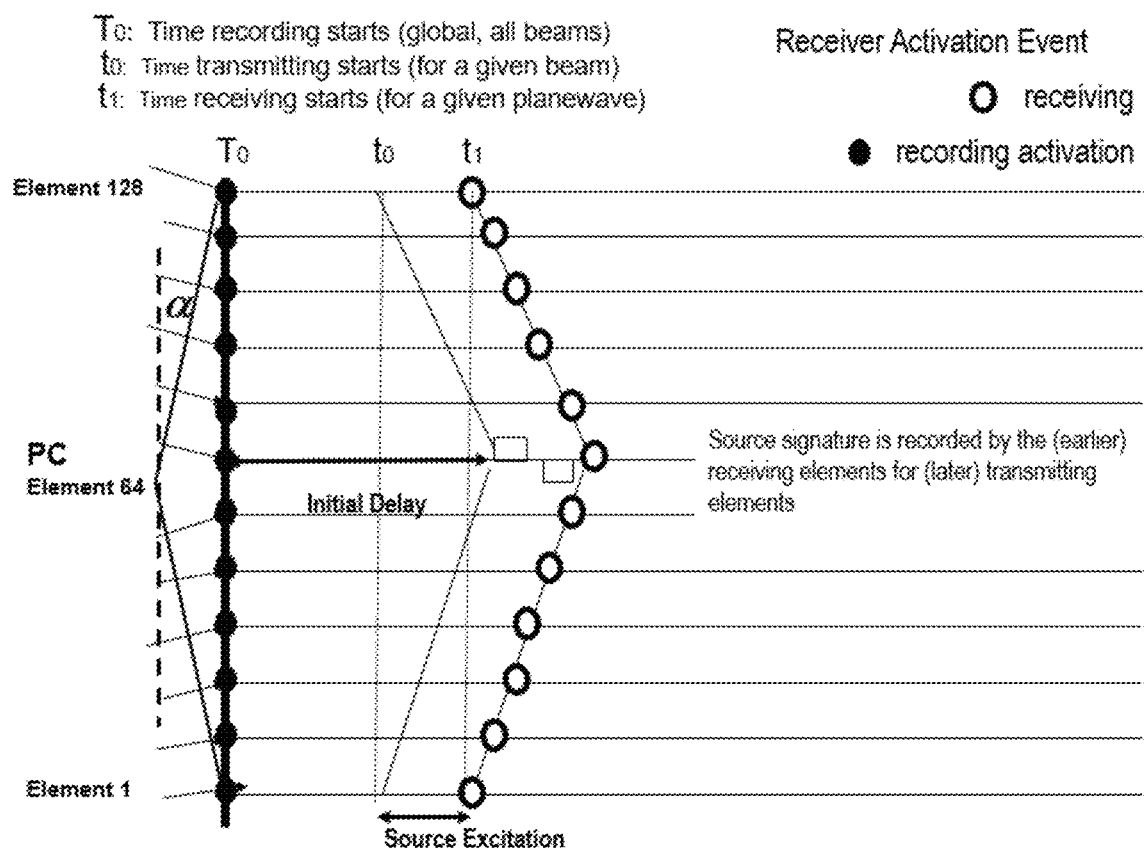
FIG. 3 illustrates a reception pattern for V-wave ultrasound beam data acquisition for a 128-element linear array transducer placed vertically. Half of the elements are used to transmit a local coherent wave in one direction and the other half of the elements are used to transmit another local coherent wave in the conjugate direction. The receiving elements are activated with a fixed time delay after activation of the corresponding transmitting elements.

FIG. 3 shows the reception design for acquisition of V-wave ultrasound beam data. The horizontal axis is lapsing time and the vertical axis is element position. We use a linear array of 128 elements as an example. Other array configurations work equally well. The receivers are activated after a fixed time delay from activations of the corresponding transmitters. The fixed time delay is also called a source excitation window. Of course one can also vary this time delay for individual element. In this design the ADC electronics is turned on at time T0 so that we can record source signatures when some transmitters are still in activation. One can also activate the ADC electronics at some other time if he/she is not interested in recording the source signatures. In FIG. 3, time t0 is the start of the first transmission and time t1 is the start of the first reception.

Part II: V-Wave Data Processing

Traditional beamforming of ultrasound data utilizes dynamic focusing method or pixel-based beamformers for focused beams, divergent beams, or planewaves [12-17]. There is no known method existed for V-wave beam data. In this section we disclose a method for performing beamforming for V-wave ultrasound data.

2.1 Beamforming Formulation of V-Wave Data

An input data sample at time t and at receiver location $x_r$, can be originated from a scatter at an unknown position (x, z) illuminated by an incident wave from a transmitter at location $x_s$. The travel time satisfies the following equation:

$$t(x_r, x, z) + t(x_s, x, z) = t + \Delta t_B(x_s) \quad (1)$$

where t is the observed time of a reflection signal at the receiver $x_r$ on a given beam. $\Delta t_B$ is a transmitter time delay for this beam at location $x_s$. (x, z) is the image (or scatter) position. $t(x_r, x, z)$ is the travel time from $x_r$ to (x, z), and $t(x_s, x, z)$ is the travel time from $x_s$ to (x, z).

Figure 4:
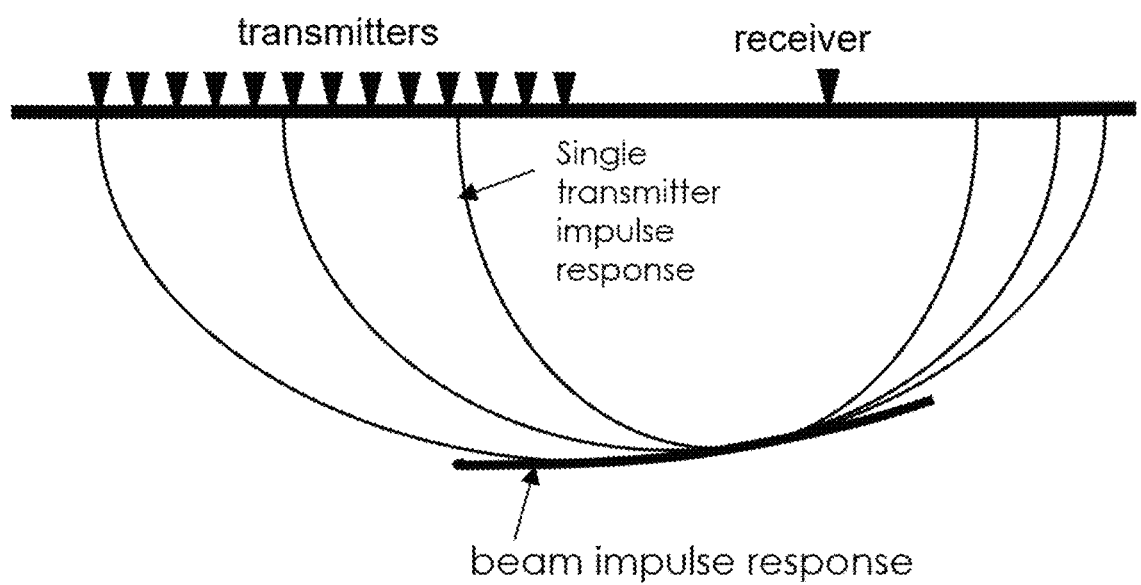
FIG. 4 shows the formation of envelope of a set of ellipses. Each ellipse is a spatial impulse response of a single data sample for a single transmitter and receiver pair. The beam impulse response (thick curve) is a stationary spatial impulse response of a single data sample for all transmitters and a single receiver.

The above equation defines an ellipse in the image domain, which is sometime called an impulse response curve for a transmitter and a receiver [18]. As the transmitter position $x_s$ moves away from the beam center location $x_c$ the transmitter time delay $\Delta t_B$ increases in V-wave data. That is, as $x_s$ changes, the ellipse in equation (1) changes in both position and radius. The envelope of all the ellipses forms an impulse response curve for an input data sample on a V-wave beam (FIG. 4, thick curve). Please recall the input sample is collected when many transmitters are emitting simultaneously with certain time delays. The impulse response curve represents all possible spatial locations where one sample on one input beam data contributes to the image formation. Summation of all impulse responses for all time samples in all V-wave beam data yields the final image. This is the key concept of our method.

FIG. 4 illustrates the formation of a beam impulse response (thick curve) from a collection of single transmitter impulse responses for a given receiver. Each single transmitter impulse response is a trajectory in image domain on which Equation (1) is satisfied. The envelope of these single transmitter impulse responses is a trajectory in image domain where a data sample in an ultrasound beam effectively contributes to. This concept applies to all types of ultrasound beam data: focused beam, divergent beam, planewave beam, and any other beam configurations.

The key to our method is to find the envelope of all the ellipses as the transmitter position changes (while holding all other parameters fixed). We define the family of ellipses as:

$$f(x, z; x_s) = t(x_r, x, z) + t(x_s, x, z) - t - \Delta t_B(x_s) \quad (2)$$

Its envelope, by definition, is given by:

$$f(x, z; x_s) = 0 \quad (3a)$$

$$\frac{\partial f}{\partial x_s}(x, z; x_s) = 0 \quad (3b)$$

The solution for (x, z) is then given by:

$$t(x_r, x, z) + t(x_s, x, z) = t + \Delta t_B(x_s) \quad (4a)$$

$$\frac{\partial t(x_s, x, z)}{\partial x_s} = \frac{\partial \Delta t_B(x_s)}{\partial x_s} \quad (4b)$$

Equation (4) gives a general formula for construction of an impulse response curve for one sample of an ultrasound beam data, including the V-wave beam data. The only requirement is that the transmitter delay function $\Delta t_B(x_s)$ be differentiable. We will use V-wave beam data as an example, but our method equally applies to other type of ultrasound beam data.

For V-wave beam data acquisition we devise the following family of functions for the transmitter delay:

$$\Delta t_B(x_s) = f\left(\frac{|x_s - x_c|}{C}, \alpha\right) \quad (5)$$

where C is a sound speed used in setting the transmitter delay, which may be different from the sound speed used in beamforming, and $\alpha$ is the flex angle of the V delay profile. The center of the transducer is assumed to be at $x_c$. The following function is used in our data examples:

$$\Delta t_B(x_s) = \frac{|x_s - x_c|}{C} \sin\alpha \, g\left(\frac{x_s - x_c}{\Delta x}\right) \quad (6a)$$

$$g(x) = \gamma\left(\frac{2}{kx}\ln\left(\frac{1+e^{kx}}{2}\right) - 1\right) \quad (6b)$$

Equation (6b) is chosen to avoid discontinuity in derivative of $\Delta t_B(x_s)$ at $x_s = x_c$ and at the same time to approximately maintain the linearity of $\Delta t_B(x_s)$ with respect to distance from the probe center. In equation (6b) the requirement is kx>1 for x≥1. Here $\Delta x$ is the pitch size of the transducer. The coefficient $\gamma$ is used to scale the value of the function g (x) to 1 at the farthest edge of the probe. In the example below we set k=1.

2.2 Implementation Details

The recommended implementation includes the following steps:
1. Take one input time series (or data trace) of a V-wave beam data at a receiver position $x_r$,
2. Perform necessary frequency filtering to protect the data from aliasing or wavelet distortion during beamforming, if desired,
3. Spray the data along the impulse response curves calculated using equations (4), (5) and (6). Also compute necessary attributes such as transmitter-receiver offset on the transducer, reflection angle at image point, wavelet stretch, anti-aliasing frequencies etc,
4. Accumulate image contributions, with options to form partial images for common image point gather generation,
5. Perform amplitude normalization for true reflection amplitude preservation, if required,
6. Repeat steps (1)-(5) for all input data traces and all V-wave beams,
7. Perform post processing and coherent compounding to obtain the final image.

The implementation method disclosed herein is robust and fast when analytical functions exist for both travel time calculation and time delay calculation. In the case where tissue sound speed varies spatially the method still yields quality images but requires a numerical solution to equation (4).

Figure 5:
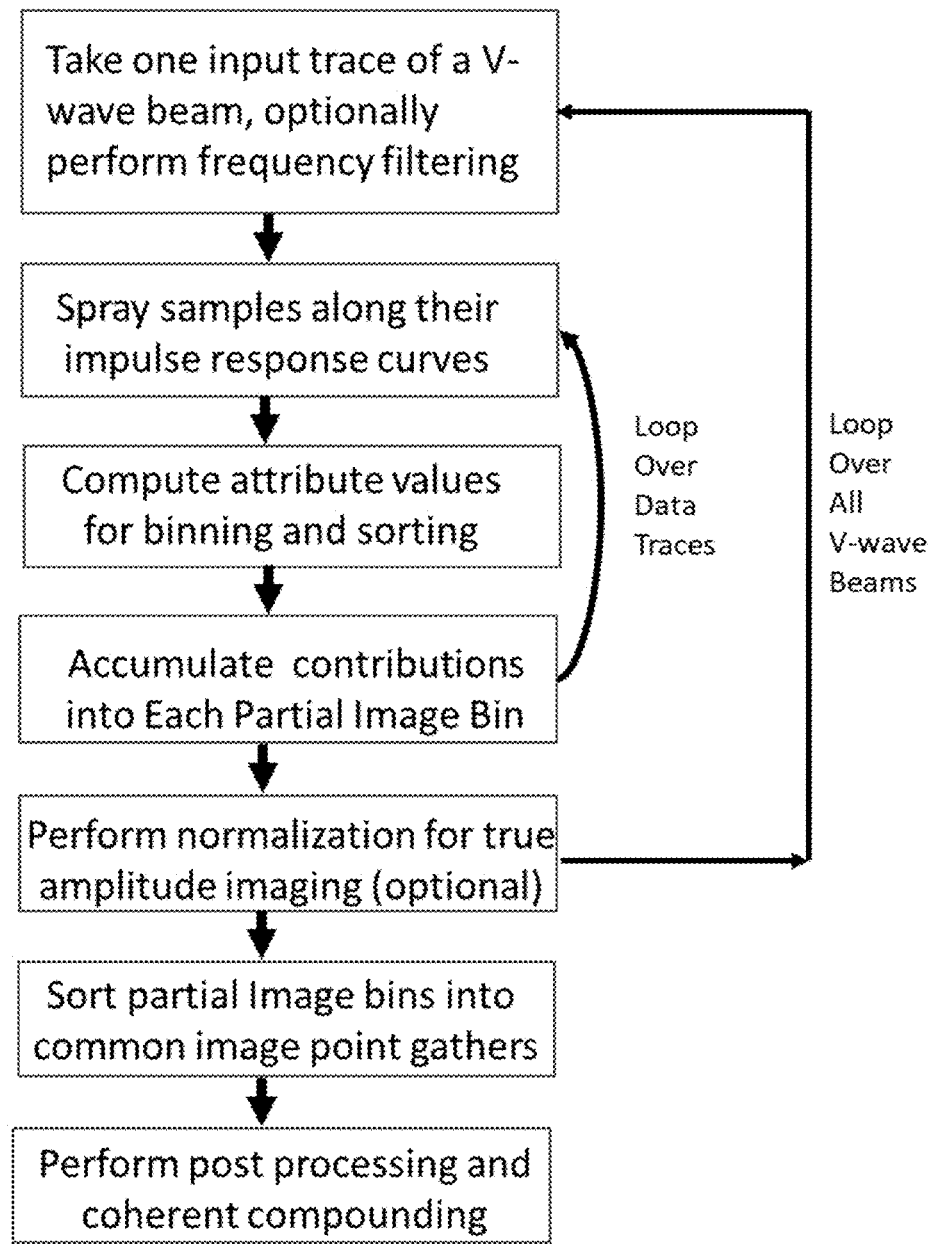
FIG. 5 is a workflow diagram of our V-wave beamformer. Each trace of a V-wave beam data is beamformed by spraying all samples onto their impulse response curves, contributing to partial image volumes in accordance with values of an attribute associated with each point on the impulse response curves. The partial image volumes are sorted into common image point gathers. The final image is formed by summing the common image point gathers at all output locations.

In the workflow diagram of the V-wave beamformer (FIG. 5) we have included the generation of partial image volumes and common image point gathers. The Common image point gathers are very useful for estimation of spatially varying effective sound speed values in order to produce the best ultrasound images. They are also useful for estimation of impedance and Poisson ratio properties from analysis of amplitude variation with reflection angles. They are even more useful for optimal compounding or stacking post beamforming. We have separate patent applications to cover all these aspects.

PART III: EXAMPLE 3.1 Echo Data Simulation

We use a modified version of Fresnel Simulator from Ultrasound Toolbox (USTB, https://www.ustb.co) for generation of numerical ultrasound beam data. The use of this simulator is subject to the citation rule. We sincerely thank the authors for making it available in the public domain [11]. The simulator is based on Fresnel approximation of diffraction of acoustic waves for rectangular transducers in a linear time invariant (LTI) system. Inputs to the simulator include a phantom model specification, a transducer specification, and a waveform specification. The phantom model used in this simulation contains: two rectangular boxes with a depth range between 7-9 mm; 4 flat continuous reflectors at 20 mm, 40 mm, 60 mm and 80 mm depth; a hyperechoic target with 8 mm radius at 70 mm depth and a second hyperechoic target with 6 mm radius at 50 mm depth; a row of scatter points at 30 mm depth and a column of scatter points at the center of the model.

Figure 6:
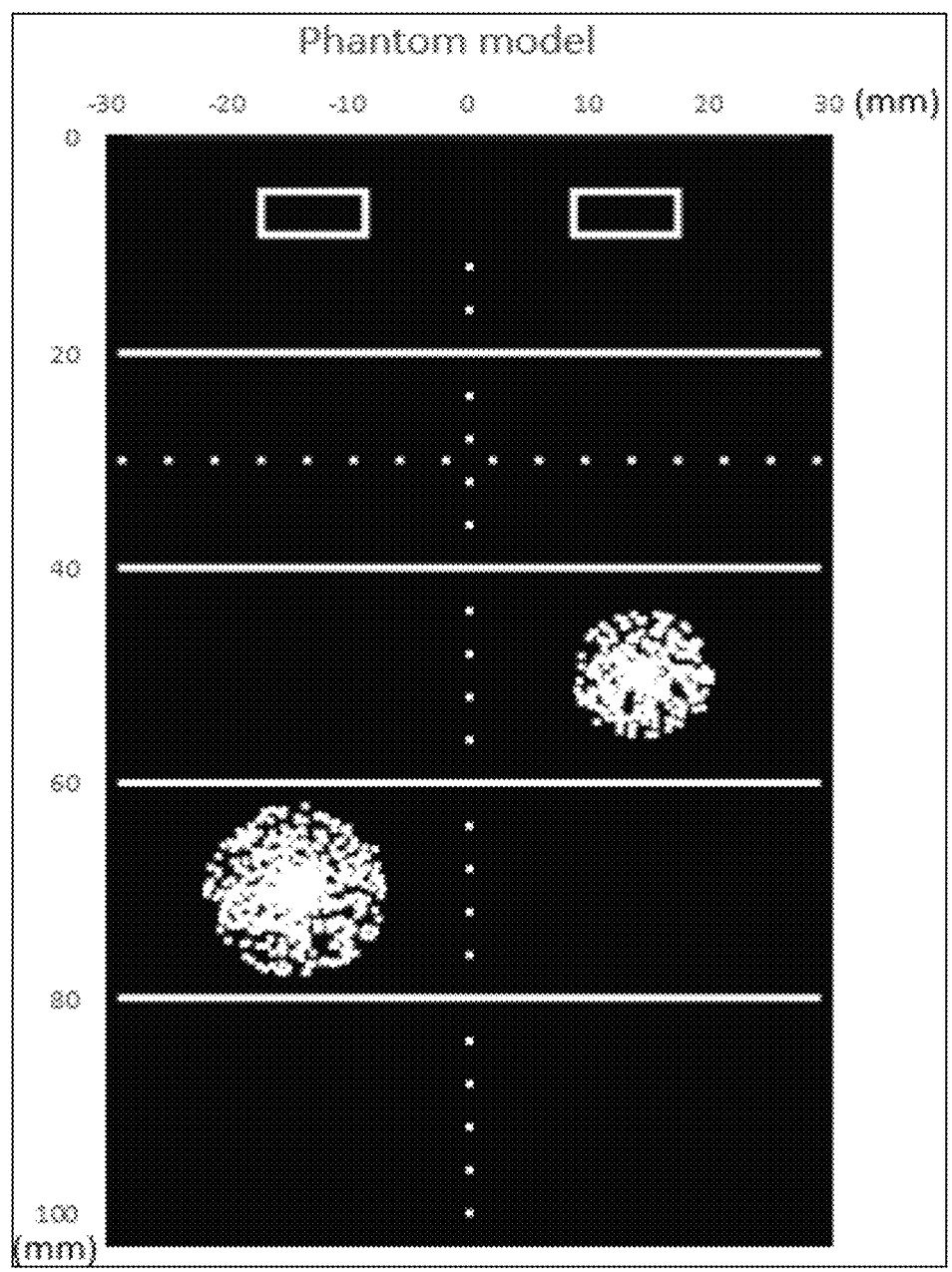
FIG. 6 shows a phantom model: white dots are point scatters and white lines are reflectors in the phantom model.

FIG. 6 is a depict of the phantom model. The transducer is a linear array transducer with 192 elements (0.3 mm in pitch size) and each element has a width of 0.27 mm and a height of 5 mm. The central frequency of the simulated echo data is 3 MHz with 80% useful bandwidth and sampling frequency was 24 MHz.

Figure 7:
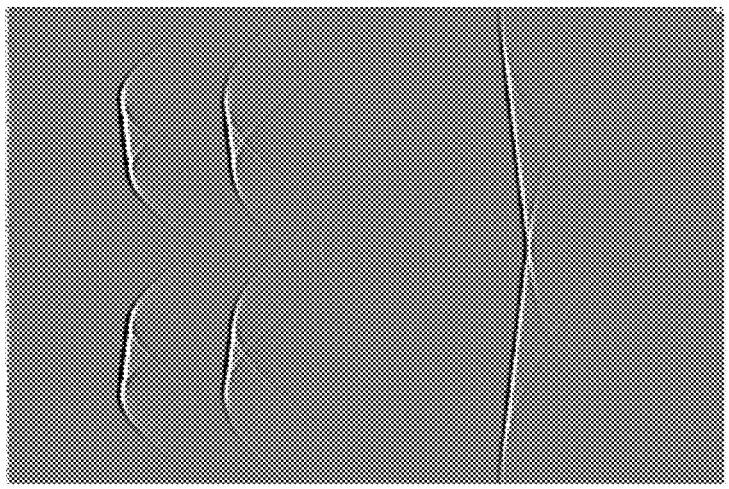
FIG. 7 shows comparisons of planewave beam raw data and V-wave beam raw data: Left is a planewave beam data with +5° tilt angle. Middle is another planewave beam data with −5° tilt angle. Right is a V-wave beam data with a flex angle of 5°.
Figure 7:
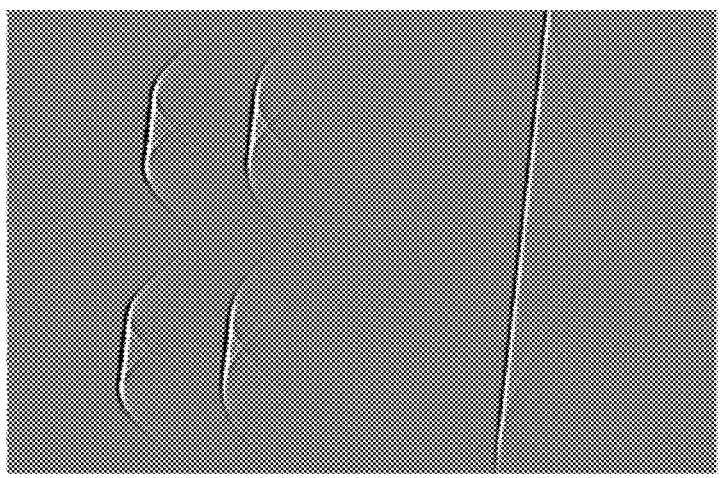
Figure 7:
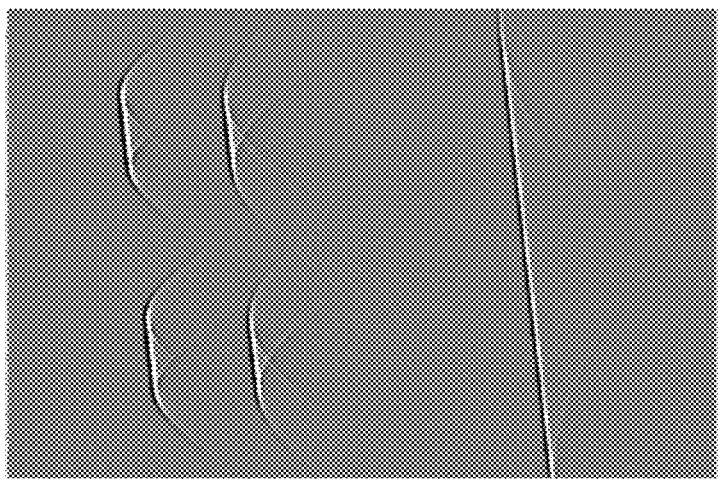

We have simulated 37 V-wave beams with flex angles ranging from 0 to 32 degree as well as 74 planewave beams with tilt angles from −32 to 32 degree. The simulation time for a V-wave beam is exactly the same as a planewave beam. FIG. 7 shows two planewaves beams with tilt angles of −5 degree and +5 degree respectively, and a V-wave beam with a flex angle of 5 degree. Please note that one V-wave beam has similar illumination coverage as two planewave beams in the central portion.

3.2 Resolution Test

Figure 8:
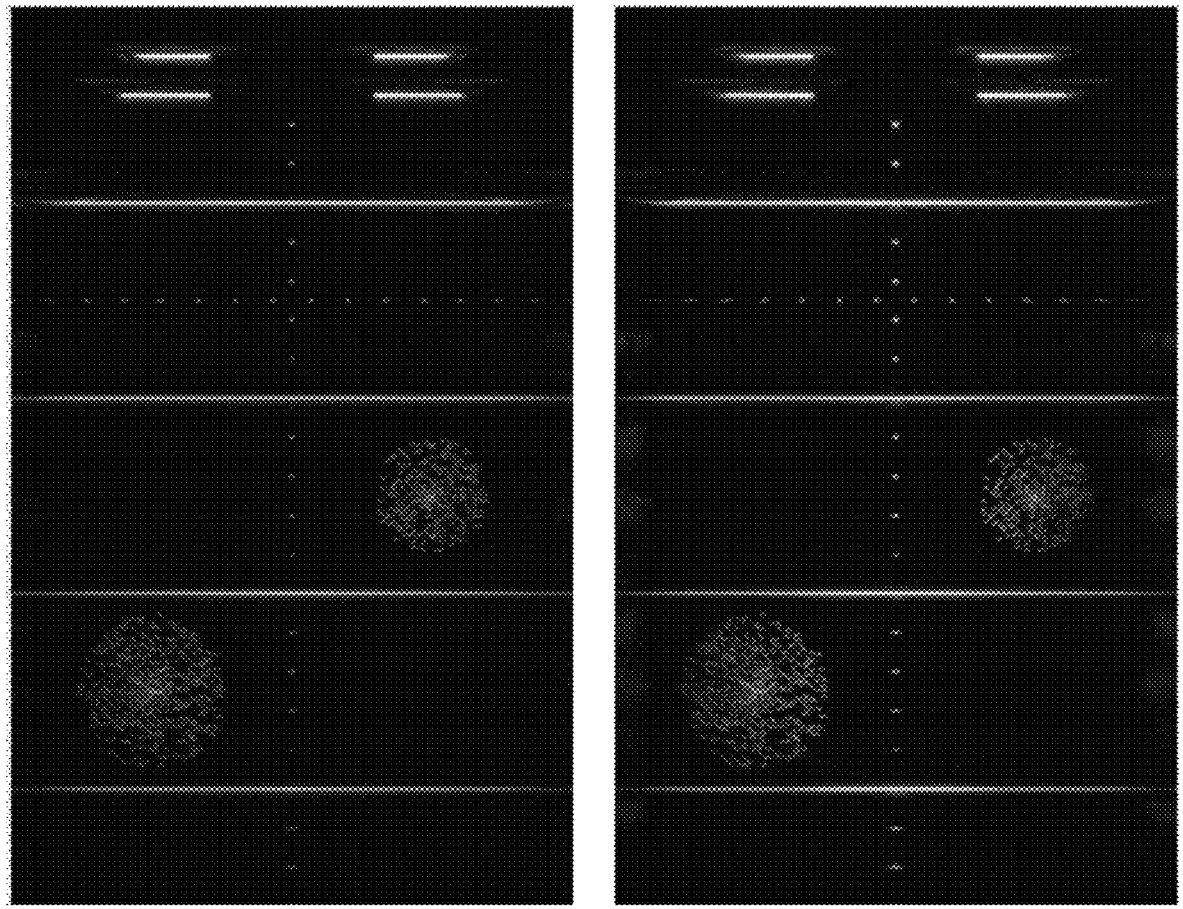
FIG. 8 shows comparisons of a planewave image and a V-wave image: Left is the final image of 74 planewaves from −32 degree to +32 degree. Right is the final image of 37 V-waves with the maximum flex angle of 32 degree. All displays are shown in 60 dB.

FIG. 8 shows a comparison of an image of the 74 planewave beams (left) and another image of the 37 V-wave beams (right). We see similar resolution and image quality. In the central portion of the image domain the V-wave image is stronger because of the enhanced focusing effect of V-wave beams.

3.3 Signal-to-Noise Ratio Test

Figure 9:
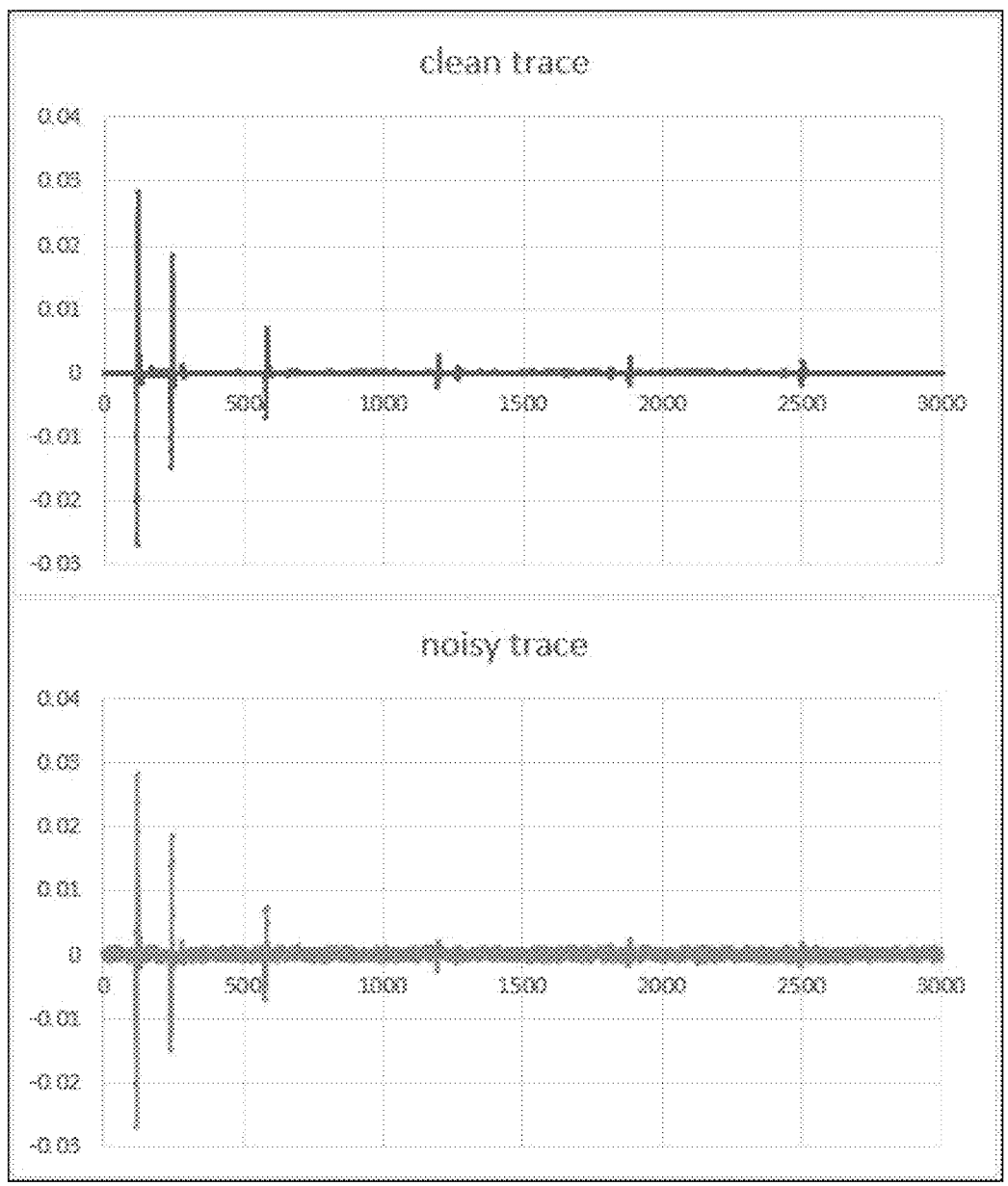
FIG. 9 shows one data trace (time series) of raw beam data (top) and the same data trace with random noises added whose maximum amplitude is −30 dB lower than the maximum amplitude of signals in the beam data (bottom). The random noises are additive and have the same bandwidth as the signals. The vertical axis is amplitude and the horizontal axis is sample index.

To test the impact of random data noises on image quality we add additive random noises whose maximum amplitudes are set at 30 dB while the maximum amplitudes of the original simulation data are scaled to 60 dB. FIG. 9 shows a representative trace before and after the noise addition.

Figure 10:
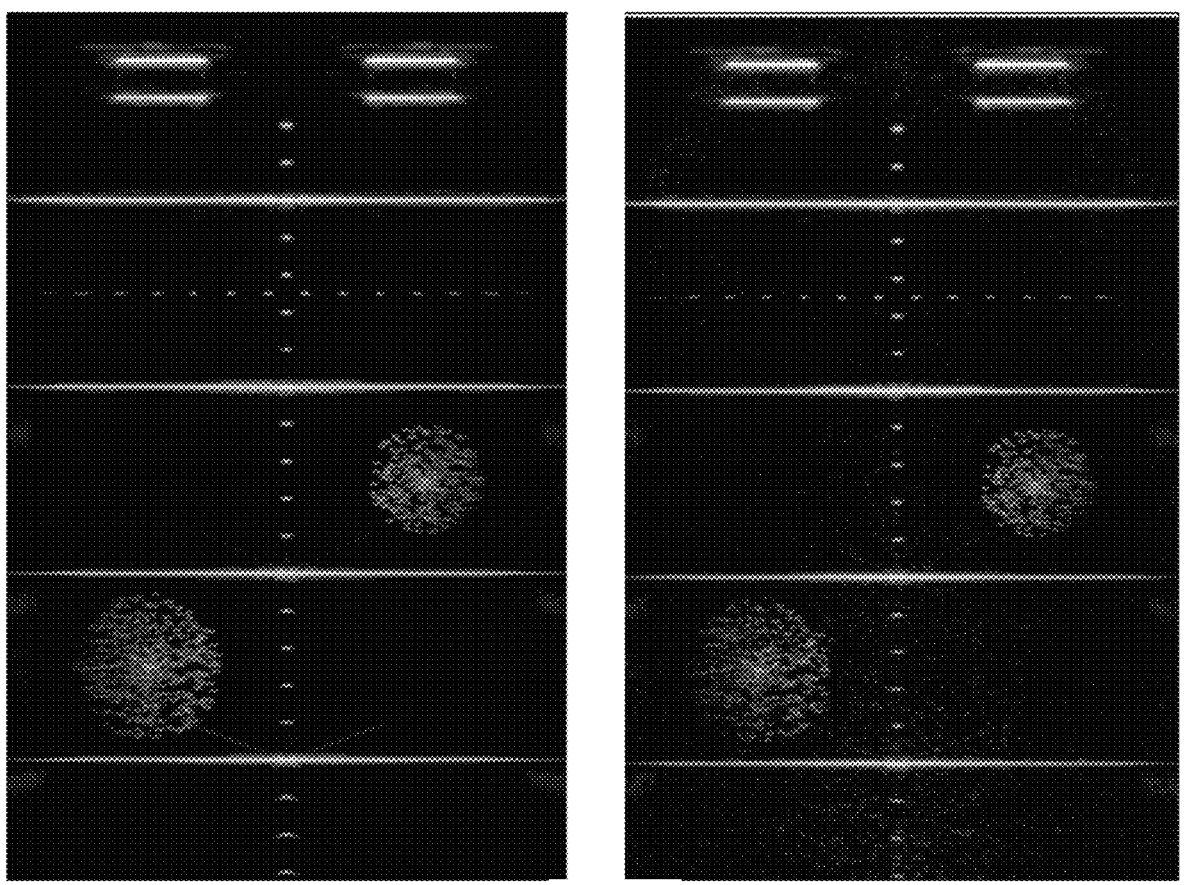
FIG. 10 shows an image of 37 V-waves synthetic beam data without noises (left) and the same image with −30 dB random noises added to the synthetic beam data (right). All displays are shown in 60 dB.

FIG. 10 shows a comparison of an image of the 37 V-wave beams with no additive noises (left) and an image of the same 37 V-wave beams with additive noises (right). Some speckles in the image can be seen when noises are added to the input data but they almost have no impact on image quality and resolution. The speckles become stronger and plenty when the noise level is increased.

PART IV: REMARKS

Figure 11:
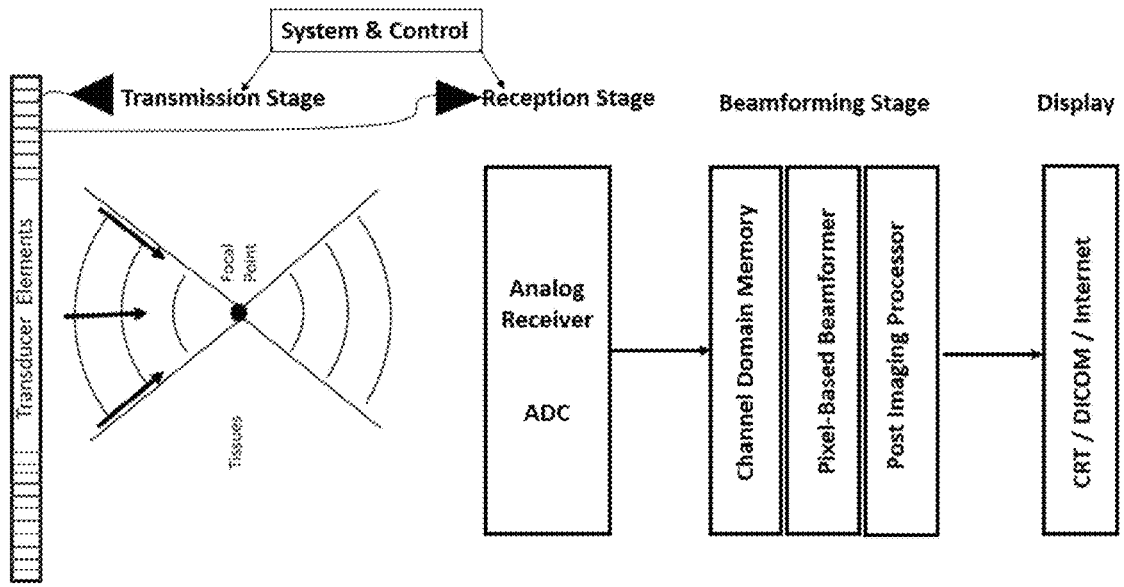
FIG. 11 shows the system architecture of modern ultrasound scanners using focused beams: Time delays of transmitters in a subarray are set in such a way that all excitations arrive at the focal point at the same time. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

FIG. 11 shows the system architecture of modern ultrasound scanners using focused beams: Time delays of transmitters in a subarray are set in such a way that all excitations arrive at the focal point at the same time. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

Figure 12:
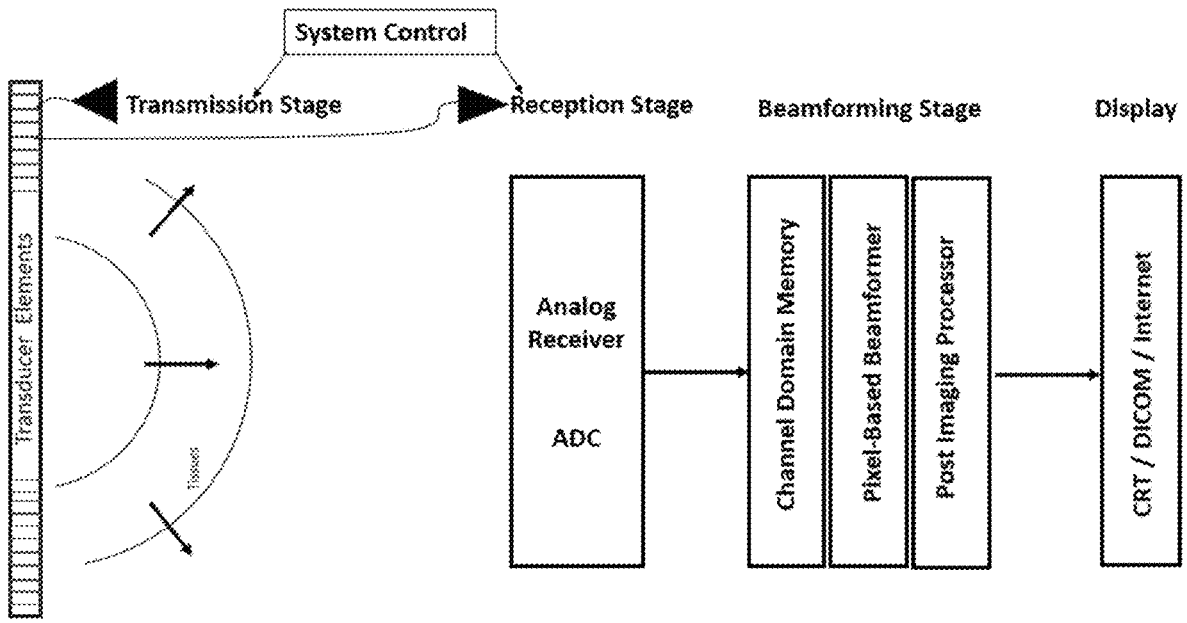
FIG. 12 shows the system architecture of modern ultrasound scanners using divergent beams: Time advances of transmitters in a subarray are set in such a way that all excitations are originated from a virtual source behind the transducer. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

FIG. 12 shows the system architecture of modern ultrasound scanners using divergent beams: Time advances of transmitters in a subarray are set in such a way that all excitations are originated from a virtual source behind the transducer. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

Figure 13:
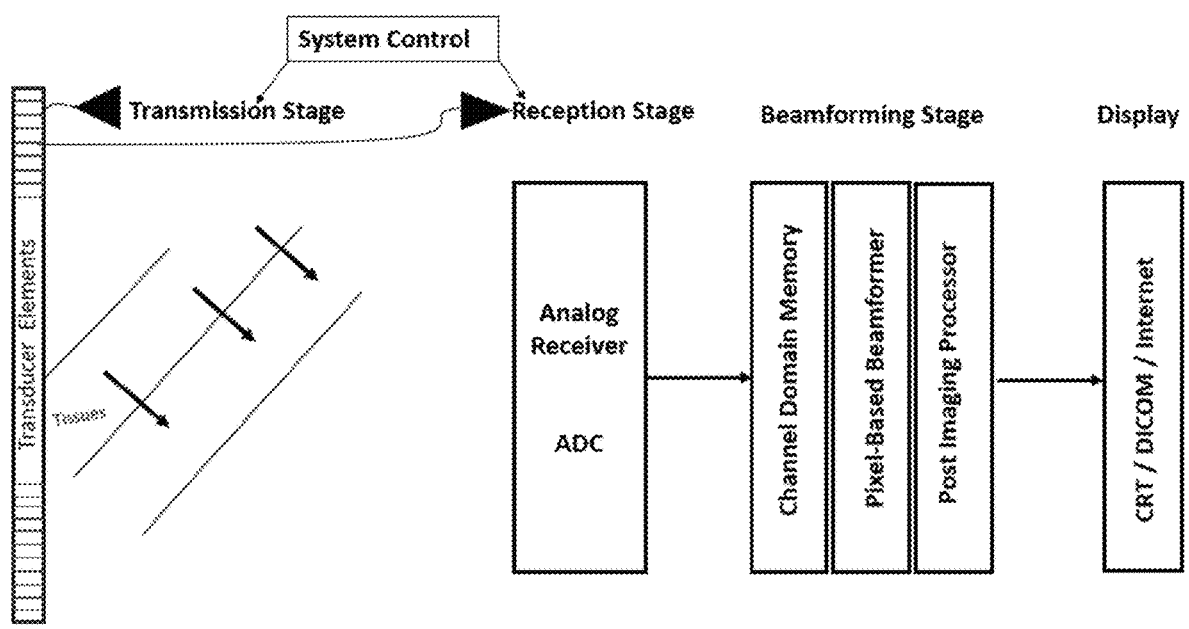
FIG. 13 shows the system architecture of modern ultrasound scanners using planewave beams: All transmitters are used in the excitation of a plane wave. The time delay is proportional to the signed distance between an element and the probe center. It is also proportional to the sine of the tilt angle. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

FIG. 13 shows the system architecture of modern ultrasound scanners using planewave beams: All transmitters are used in the excitation of a plane wave. The time delay is proportional to the signed distance between an element and the probe center. It is also proportional to the sine of the tilt angle. Reflection echoes are received, amplified, anti-aliasing filtered, and converted into digital signals in the reception stage. Channel data memory is used to store the beam data. Upon completion of a frame the data in memory are feed into a pixel-based beamformer to generate an image. The image is then sent to a post processor for signal enhancement, envelope computation, and logarithm conversion prior to final display and delivery.

Figure 14:
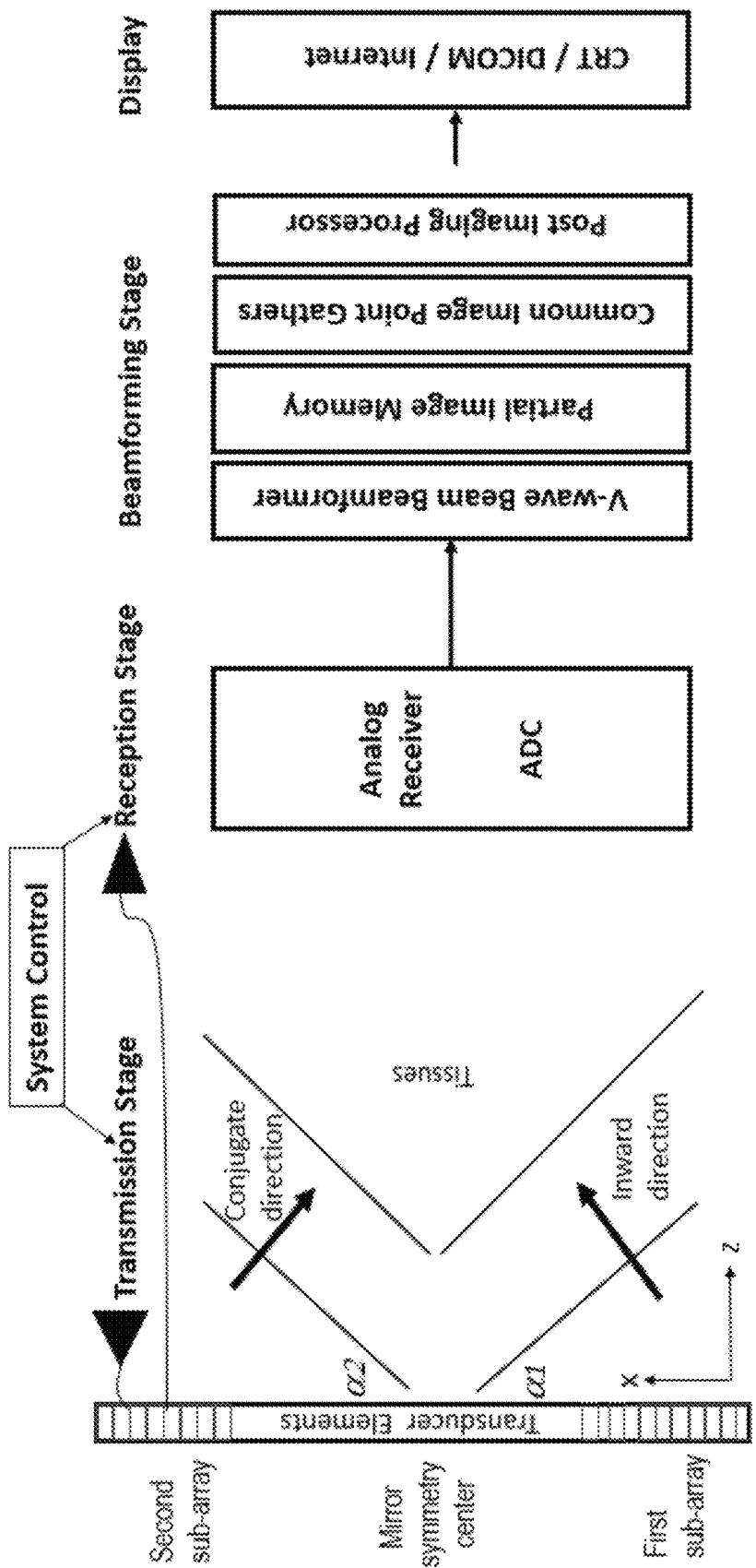
FIG. 14 shows the system architecture of a new ultrasound system according to the present invention: The first half sub-array excites a local planar wave traveling towards the center. At the same time, the second half sub-array excites another local planar wave traveling in the conjugate direction (also towards the center). Reflection echoes are received, amplified, anti-aliasing filtered, and converted into digital signals in the reception stage. Immediately after acquiring a V-wave beam, the data are feed into a pixel-based beamformer to generate a partial image. Partial image memory is used to store the partial images. Upon completion of a frame the data in partial image memory are sorted into common image point gathers. The gathers are processed further and coherently compounded to form a complete image. The image is then sent to a post processor for signal enhancement, envelope computation, and logarithm conversion prior to final display and delivery.

FIG. 14 shows the system architecture of a new ultrasound system according to the present invention: The first half sub-array excites a local planar wave traveling towards the center. At the same time, the second half sub-array excites another local planar wave traveling in the conjugate direction (also towards the center). Reflection echoes are received, amplified, anti-aliasing filtered, and converted into digital signals in the reception stage. Immediately after completion of acquiring a V-wave beam, the data are feed into a pixel-based beamformer to generate a partial image. Partial image memory is used to store the partial images. Upon completion of a frame the image data in partial image memory are sorted into common image point gathers. The gathers are processed further and stacked to form a complete image. The image is then sent to a post processor for signal enhancement, envelope computation, and logarithm conversion prior to final display and delivery.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

REFERENCES

[1] Richard S. C. Cobbold (2007), Foundations of Biomedical Ultrasound, Oxford University Press, pages 431-437.
[2] O. H. Schuck (1957), Variable Focus Transducer, U.S. Pat. No. 3,090,030, May 14, 1963.
[3] B. S. Hertzberg and W. D. Middleton (2016), Ultrasound: The Requisites, The Third Edition, Elsevier. Chapter 1, pages 3-31. Also at expertconsult.com.
[4] P. Suetens (2009), Fundamentals of Medical Imaging. 2nd Edition, Cambridge University Press, pages 33-158.
[5] D. M. Smith, D. F. Specht, L. V. Cabrea, K. D. Brewer, and D. J. Specht (2021), Concave Ultrasound Transducers and 3D Arrays, U.S. patent application Ser. No. 17/099,116, Filed Nov. 16, 2020.
[6] I. Waechter-Stehle and J. Weese (2020), 3D Ultrasound Imaging System, U.S. patent application Ser. No. 18/894,398, Filed Jun. 5, 2020.
[7] J. Flynn and R. E. Daigle (2019), Estimation and Display for Vector Doppler Imaging using Plane Wave Transmissions, U.S. patent application Ser. No. 16/560,851, Filed Sep. 4, 2019.
[8] T. K. Song and J. H. Chang (2003), Synthetic Aperture Focusing Method for Ultrasound Imaging Based on Planar Waves, U.S. patent application Ser. No. 10/180,614, Filed Jun. 25, 2002.
[9] N. T. Schiefler, J. M. Maia, F. K. Schneider, A. J. Zimbico, A. A. Assef, and E. T. Costa (2018), Generation and Analysis of Ultrasound Images Using Plane Wave and Sparse Arrays Techniques, Sensors, Vol. 18, 3660.
[10] G. Montaldo, M. Tanter, J. Bercoff, N. Benech, and M. Fink (2009), Coherent Planewave Compounding for very high Frame Rate Ultrasonography and Transient Elastography, IEEE Trans Ultrasonics, Ferroelectronics and Frequency Control, Vol. 56, pages 489-506.
[11] A. Rodriguez-Molares, Fresnel simulator, http://www.ustb.no/examples/fresnel/
[12] R. E. Daigle (2009), Ultrasound Imaging System with Pixel Oriented Processing, U.S. Pat. No. 0,112,095 A1, May 19, 2009.
[13] R. Zemp and M. F. Insana (2007), Imaging with Unfocused Regions of Focused Ultrasound Beams, J. Acoust. So. Amer. Vol. 121, pages 1491-1498.
[14] N. Q. Nguyen and Richard Q. Prager (2016), High-resolution Ultrasound Imaging with Unified Pixel-Based Beamforming, IEEE Transactions on Medical Imaging, Vol. 35, pages 98-108.
[15] O. M. H. Rindal (2019), Software Beamforming in Medical Ultrasound Imaging—a Blessing and a Curse, Ph.D. Thesis, University of Oslo.
[16] O. M. H. Rindal, A. Rodriguez-Molares, and A. Austeng (2018), A Simple, Artifact-free, Virtual Source Model, IEEE International Ultrasonics Symposium, IUS 1-4. https://doi.org/10.1109/ultsym.2018.8579944.
[17] D. J. Napolitano, B. D. DeBusschere, G. W. McLaughlin, L. Y. Mo, C. H. Chou, T. L. Ji, R. W. Steins (2011), Continuous Transmit Focusing Method and Apparatus for Ultrasound Imaging Systems, U.S. Pat. No. 8,002,705, Issued August, 2011.
[18] O. Yilmaz (2011), Seismic Data Analysis: Processing, Inversion and Interpretation of Seismic Data, Society of Exploration Geophysicists.

What is claimed is:

1. An ultrasound system comprising:
a V-wave ultrasound data acquisition with a transducer that includes an array of transducer elements, the array of transducer elements including a first sub-array and a second sub-array;
a V-wave ultrasound beamformer to receive ultrasound beams from the V-wave ultrasound data acquisition and generate ultrasound images; and
an ultrasound image display to render the ultrasound images locally or transmit the images over internet,
wherein the first sub-array transmits first planar wave ultrasound beams in a plural of inward directions, and the first planar wave ultrasound beams have a plural of first flex angle $\alpha_1$, the first flex angle di being an angle of the local wave front of the first planar wave ultrasound beam and the first sub-array;

wherein the second sub-array transmits second planar wave ultrasound beams in a plural of conjugate directions at a same time, and the second planar wave ultrasound beams have a plural of second flex angle $\alpha_2$, the second flex angle $\alpha_2$ being an angle of the local wave front of the second planar wave ultrasound beam and the second sub-array;

wherein the inward directions and the conjugate directions are opposing each other;

wherein the local wave front of the first planar wave ultrasound beam and the local wave front of the second planar wave ultrasound beam form a V-shaped pattern;

wherein the first flex angle di and the second flex angle $\alpha_2$ are adapted for changing from larger than 0° to less than 45°; and wherein the first sub-array illuminates a center of and a first portion of an image domain, and the second sub-array illuminates the center of and a second portion of the image domain.

2. The ultrasound system of claim 1, wherein the array of transducer elements is a linear array.

3. The ultrasound system of claim 1, wherein the array of transducer elements is a curved array.

4. The ultrasound system of claim 1, wherein the first flex angle 1 is identical to the second flex angle $\alpha_2$.

5. The ultrasound system of claim 1, wherein the first sub-array and the second sub-array connect continuously to form the array of transducer elements and have a mirror symmetry in transmission.

6. The ultrasound system of claim 5, wherein the first sub-array starts to transmit the first planar wave ultrasound beams from an edge thereof to a mirror symmetry center with each time slope a function of the first flex angle $\alpha_1$.

7. The ultrasound system of claim 5, wherein the second sub-array starts to transmit the second planar wave ultrasound beams from an edge thereof to a mirror symmetry center with each time slope a function of the second flex angle $\alpha_2$.

8. A method for beamforming and processing V-wave ultrasound beam data comprising:

(i) taking an input trace from the V-wave ultrasound beam data;
(ii) spraying the V-wave ultrasound beam data along impulse response curves;
(iii) accumulating contributions at each image location;
(iv) repeating steps (i)-(iii) for all data traces in all input beams; and
(v) performing post processing and coherent compounding to obtain the final image, wherein the impulse response curves are calculated using equations (4a), (4b), 6(a) and (6b):

$$\frac{\partial t(x_s, x, z)}{\partial x_s} = \frac{\partial \Delta t_B(x_s)}{\partial x_s} \tag{4b}$$

$$t(x_r, x, z) + t(x_s, x, z) = t + \Delta t_B(x_s) \tag{4a}$$

$$\Delta t_B(x_s) = \frac{|x_s - x_c|}{C} \sin \alpha \, g\left(\frac{x_s - x_c}{\Delta x}\right) \tag{6a}$$

$$g(x) = \gamma \left(\frac{2}{kx} \ln\left(\frac{1 + e^{kx}}{2}\right) - 1\right) \tag{6b}$$

where C is a sound speed, $\alpha$ is a flex angle, the center of a transducer is at $x_c$, a transmitter is at $x_s$, a receiver is at $x_r$, an output image point is at (x, z), t is an observed time, $\Delta t_B$ is a transmitter time delay, $t(x_r, x, z)$ is a travel time from $x_r$ to (x, z), and $t(x_s, x, z)$ is a travel time from $x_s$ to (x, z), $\Delta x$ is a pitch size of the transducer, a coefficient $\gamma$ is used to scale the value of function $g(x)$ to 1 at the farthest edge of a probe, a parameter k is used to control the linearity of function $g(x)$.

9. The method of claim 8, further comprising:
performing frequency filtering to protect the V-wave ultrasound beam data from aliasing or excessive wavelet distortion during beamforming.

10. The method of claim 8, further comprising:
forming partial image volumes for generation of common image point gathers.

11. The method of claim 8, where other choices of function $\Delta t_B$ are used as long as their first derivatives are continuous at $x_s = x_c$.

* * * * *